United States Patent [19]

Wykoff

[11] Patent Number: 5,297,362
[45] Date of Patent: Mar. 29, 1994

[54] FACETING HEAD APPARATUS FOR WORKING COLORED STONES

[76] Inventor: Gerald L. Wykoff, 11 Maple Rd., York, Pa. 17403

[21] Appl. No.: 958,768

[22] Filed: Oct. 9, 1992

[51] Int. Cl.$^5$ .......................... B24B 7/22; B24B 9/06; B24B 9/16
[52] U.S. Cl. .................................. 51/125.5; 51/125; 51/216 LP; 51/216 A
[58] Field of Search ..................... 51/229, 230, 216 R, 51/125, 125.5, 217 A, 216 LP, 216 A

[56] References Cited

U.S. PATENT DOCUMENTS

| | | | |
|---|---|---|---|
| 1,228,919 | 6/1917 | Hilliard | 51/229 |
| 2,542,698 | 2/1951 | O'Brien | 51/229 |
| 2,716,403 | 8/1955 | Moser | 125/30.01 |
| 2,779,138 | 1/1957 | Collar | 51/124 L |
| 3,073,085 | 1/1963 | Ticino | 51/229 |
| 3,135,073 | 6/1964 | Odle | 51/229 |
| 3,435,569 | 4/1969 | Stanley | 51/229 |
| 3,439,456 | 4/1969 | Bailey | 51/279 |
| 3,559,349 | 2/1971 | Imahasi | 51/229 |
| 3,861,090 | 1/1975 | Lattanzio | 51/229 |
| 3,940,888 | 3/1976 | Wain | 51/229 |
| 4,106,240 | 8/1978 | De Bartolo | 51/229 |
| 4,221,082 | 9/1980 | Weissman | 51/229 |
| 4,265,057 | 5/1981 | Hoffman | 51/229 |
| 4,517,770 | 5/1985 | Leibowitz | 51/125.5 |
| 4,955,162 | 8/1990 | Jackson | 51/125.5 |
| 5,094,038 | 3/1992 | Maruyama | 51/216 A |

Primary Examiner—Bruce M. Kisliuk
Assistant Examiner—Bo Bounkong

[57] ABSTRACT

A faceting device for holding precious stones during cutting and polishing the facets. It comprises a two-part indexed quill member having a mounting at one end for mounting and locking the stone position relative to a horizontally rotating abrasive lap wheel and a cylindrically configured tailstock element at the other end. The tailstock is tightly and diametrically received in a backplate containing trigonometrically positioned multiple rows of grooves which obtain a multiplicity of different angular settings. The upper and lower portions of the quill attach by a male rod in the lower quill which is slidably received in an elongated opening in the upper portion where a hand set screw extending radially into the upper quill portion can be turned against the male rod to secure the lower quill in angularly rotated adjusted position. The backplate attaches to a vertical mast and is locked at desired heights by a hand set screw threaded radially through a backplate collar and turned against the mast.

2 Claims, 4 Drawing Sheets

FACETING HEAD APPARATUS FOR WORKING COLORED STONES

BACKGROUND OF THE INVENTION

This invention relates to a modification of the lapidary industry's traditional jamb peg faceting mechanism. For grinding facets with a traditional jamb peg, a gemstone is normally adhesively attached to one end of a relatively short metal or wooden dowel-like peg (sometimes also referred to as a "quill" or "dop stick") with the rear tip of the peg jambed or positioned into a backplate assembly whose surface is provided with various holes or slots. The vertical location of the various backplate holes or slots into which the dop stick is fitted establishes an approximate triangle which permits engagement by the stone to an horizontally rotating abrasive lap wheel with the said assembly providing the three necessary elements required for faceting: 1, controlling freehand rotation about the dop stick's longitudinal axis (INDEX); 2, controlling movement about an axis extending perpendicular to the dop stick's axis of rotation (ANGLE); 3, controlling the dop stick in an elevation vertically addressed to the fixed angle position of the abrasive disk (HEIGHT). Consequently, with few mechanical stops or controls in a standard jamb peg device great emphasis must be placed on the operator's experience and ability to estimate and establish the peg or dop stick setting to achieve coordinated discipline of height, index, and angle of the stone relative to the rotating abrasive disks for each facet and/or row or tier of facets which comprise the plurality of facets intended to be placed on the stone in the desired symmetry and configuration.

With more contemporaneous protractor type faceting machines as well as jamb peg faceting machines, a rough crystal is faceted in a two-phase operation: in the first phase, the crystal is adhesively attached to a dopstick and the top (called the "crown") or the bottom (called the "pavilion") is cut. The dopstick/stone assembly is then removed from the faceting machine so a second dopstick may be adhesively attached to the cut half of the crystal in a precisely opposite orientation; in the second phase, the initial dopstick is removed and the new dopstick/stone assembly is then returned to the faceting machine so the remaining half of the crystal may be completed.

Over the years, various innovations have been introduced to the jamb peg assembly so as to provide greater mechanical discipline as an alternative to such excessive dependance on operator judgment for height, angle and index. While the level of the art has been improved, none of these variations in industry literature or patents have provided comprehensive and calibrated coordination of height, angle and index together with automatic and rigidly disciplined angle and height positions which remain independent of the operator's judgement.

This invention is a calibrated jamb peg because it provides such coordinated angle plus height and index calibration by defining machine elements as the three elements of a right triangle: 1, the two-part quill member length functions as the hypotenuse; 2, the vertical positions of the multiple backplate grooves function as the opposite side, 3, and the distance between the rear of each groove and the position on the rotating abrasive lap wheel of the lowest end of the quill member functions as the adjacent side. By providing a mathematically correct vertical groove position for each angle, the operator need confirm only the first angle setting and all other angle grooves will thus be mathematically appropriate. Any minor discrepancy introduced by variable stone size can be accommodated by using a template to confirm the proper height and angle of the specific groove.

SUMMARY OF THE INVENTION

A primary objective of the present invention is to establish an easier, faster and more calibrated, repeatable control for a gemstone's presentation to the abrasive lap wheel so that the grinding of facets or flat surfaces circumferentially about the stone produces subsequent rows or tiers of facets of varying depths and angles which are arranged with maximum discipline.

A further objective of the present invention is to provide an easily manipulated calibrated jamb peg assembly of minimum parts—a triangulized backplate and a two-piece calibrated quill member—so that even an unskilled person may more quickly learn to utilize the assembly to place accurately calibrated machine controlled facets and/or rows or tiers of facets upon a colored stone, arranged circumferentially and concentrically at varying and predetermined heights, angles, and indices.

A further objective of this invention is to provide for a backplate whose rounded slots into which the tailstock of the quill member is fitted are trigonometrically positioned vertically in order to provide accurate, repeatable angle and height presentations of the stone to the abrasive lap wheel while at the same time obviating the operator's need to make subsequent mast/height adjustments after the initial setting.

A still further objective of the invention is to provide a sensitive and easily repeatable horizontal cylinder-and-groove or -slot fitting between the multiple horizontally extending arcuately shaped backplate grooves and the horizontally cylindrical tailstock of the upper quill portion which permits not only vertical and horizontal oscillation of the entire quill member but also eliminates undesired rotation of the quill member about its longitudinal axis plus offering convenient quill member removal from and replacement to the desired backplate grooves as work progresses.

A still further objective is to provide a calibration control and lock on the dopstick holding lower quill portion so an operator may select individual index symmetry settings and thus more discreetly and accurately maneuver the stone onto the rotating abrasive lap wheel thereby effecting a consistent, predictable flat-to-flat interface with easily repeatable interface encounters between each flat facet and flat lap wheel surface.

A final objective is to provide said colored stone faceting invention in such a manner that it consists of few parts, is of simple construction, may be economically manufactured yet provide for an apparatus that is long lasting, accurate, and trouble free throughout its life cycle.

Other vital objects and advantageous features of the invention will become apparent from the following description supported by accompanying drawings which, for purposes of illustration only, are provided in detail in specific form.

DESCRIPTION OF THE PREFERRED EMBODIMENT

Figure 1:
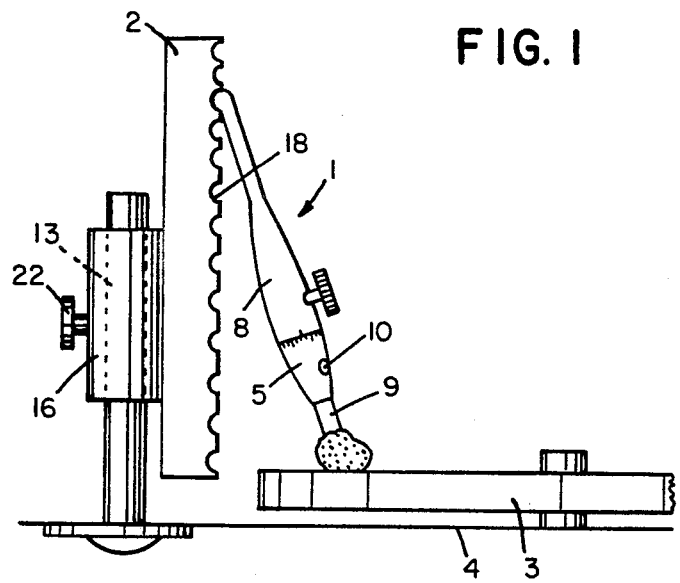
FIG. 1 is a side elevational view of the calibrated jamb peg faceting assembly showing the grooved backplate and the dop stick holding quill member in the typical triangular relationship to the abrasive lap wheel
Figure 2:
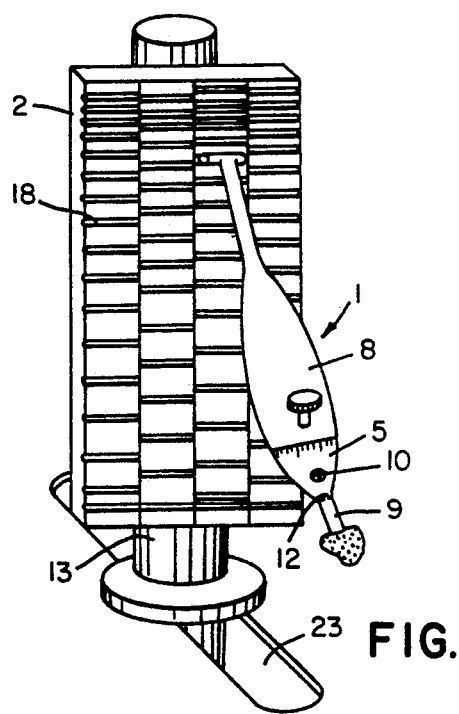
FIG. 2 is a front perspective view of the embodiment illustrated in FIG. 1.
Figure 3:
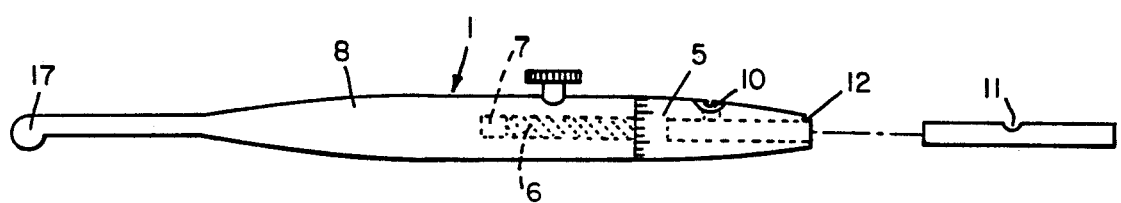
FIG. 3 is a side view of the two-part dopstick holding quill member and dopstick as illustrated in FIGS. 1 and 2
Figure 4:
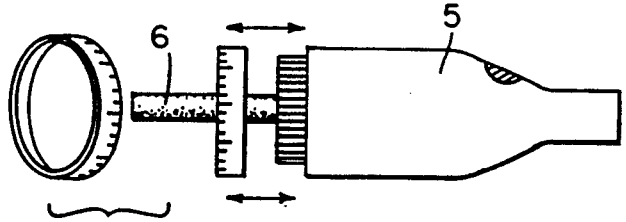
FIG. 4 shows exploded views of the optional lower quill portions of the two-part dop stick holding member lower quill portions, showing variations with interchangeable index rings as well and with symmetry mark engravings in the head itself.

Referring in detail to the drawings wherein like parts are designated by like numerals throughout the several views, in FIGS. 1, 2, and 3 the numeral 1 generally designates the two-part dop stick holding quill member for the present invention which is supported by the grooved backplate 2 adjacent to a horizontally rotating abrasive lap wheel 3 which rotates about a vertical axis with respect to a base 4. As seen in FIG. 4, the lower quill portion 5 of the quill member features a circular rod male projection 6 which is slidably received by a longitudinal bore 7 in the upper quill portion 8 of the quill member. The lower tip of the lower quill portion 5 contains a longitudinal bore to slidably receive a 2" long metal dowel called a dop stick 9. Gem crystals are adhesively attached to the dop sticks (FIG. 3) which are subsequently inserted into the longitudinal bore of the lower quill portion 5 and are subsequently locked in place by a handset screw 10 which extends radially into the lower quill portion and is turned against the dopstick. A key hole 11 is drilled into each dopstick and this hole with the insertion of a removable pin is aligned with slot 12 in the lower quill portion 5 so that each dopstick 9 will protrude from the tip of the front quill portion 5 in the front element precisely 1" (FIG. 2) so as to maintain the mathematical length integrity of the triangle upon which the device is predicated.

Figure 7:
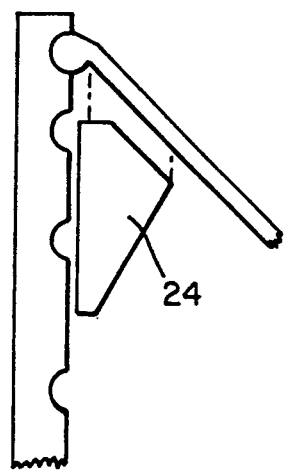
FIG. 7 is a plan view of the stiff template which fits between the quill member and backplate to confirm accuracy in the setup for the initial height-angle setting of the backplate.
Figure 8:
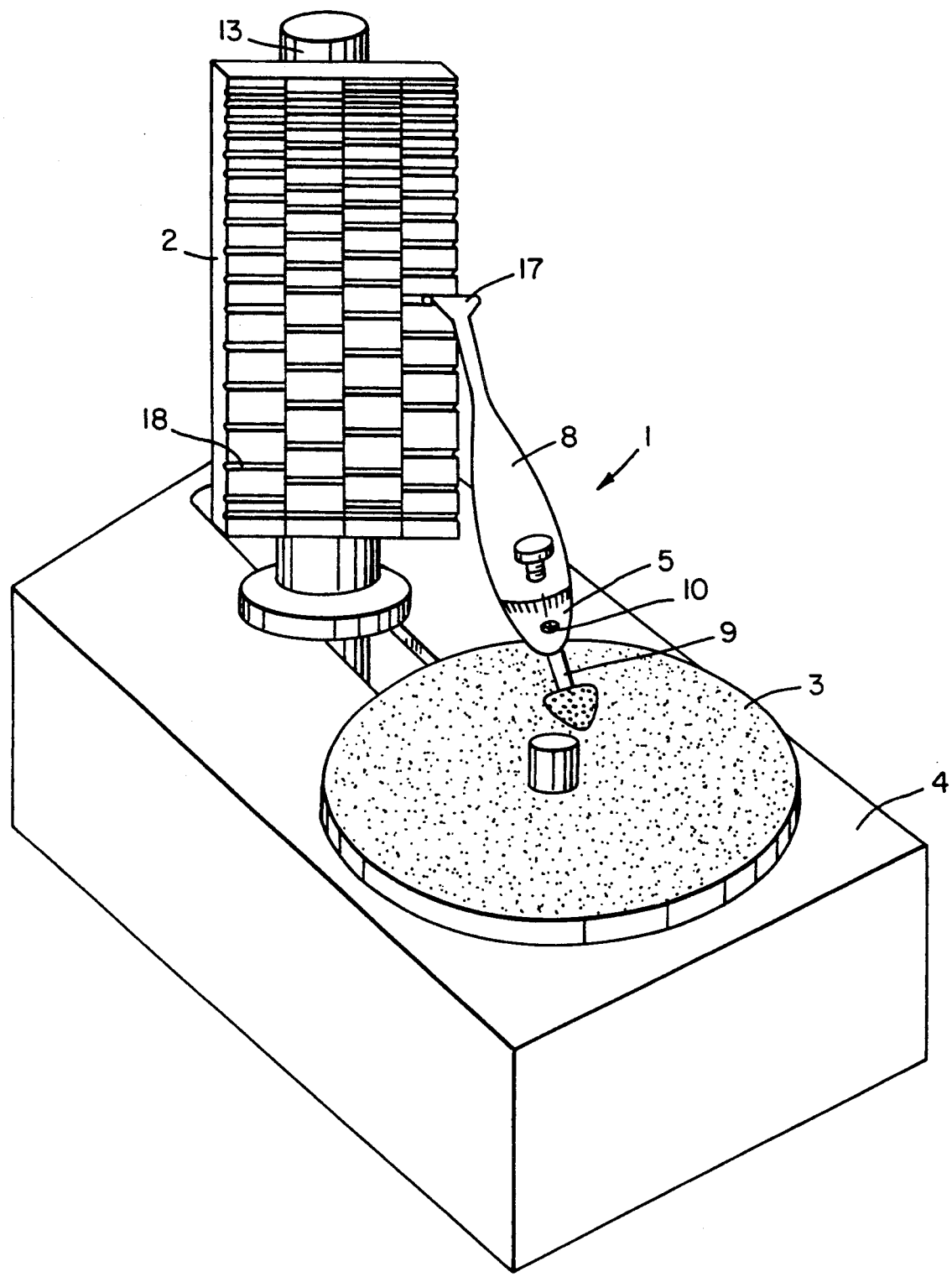
FIG. 8 is a perspective view of the entire embodiment showing the calibrated jamb peg apparatus mounted on the vertical mast which is positioned in the elongated slot of the mounting base unit.

Because crystal size can exert some influence on the accuracy of the important first angle setting of the backplate vertical position on the mast, a template 24 cut to the angle of the most important angles (FIG. 7) e.g., the crown main angle and/or the pavilion main angle, can be positioned temporarily between the front of the backplate and the flat tailstock section, thus confirming precise accuracy of the important first angle setting.

To assure that the lower quill portion 5 and the upper quill portion 8 remain tightly butted against each other for registration purposes while in cutting mode (FIG. 2) yet still yield desired rotational capabilities of the lower quill portion 5 for purposes of selecting individual facet index settings, a hand set screw extends radially through the upper quill portion 8 and is turned against the front element male rod 6 while inserted in the longitudinal bore 7.

Figure 5:
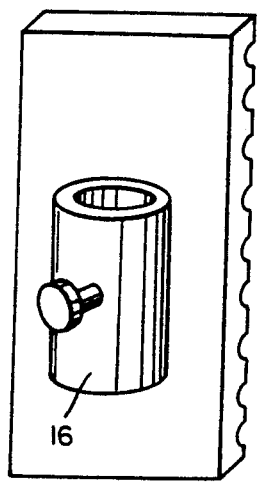
FIG. 5 is a rear perspective view of the grooved backplate showing the shaft collar element which slips over and can be tightened against the vertical mast by a hand set screw.

A shaft collar 16 on the rear of the backplate 2 (FIG. 5) and whose inner diameters allows slippable mounting of the backplate to a vertically extending cylindrical mast 13 whose bottom end is fixed to base 4 and which slides along an elongated slot 23 forward and away from the axis of rotation. The height position of the backplate 2 on the mast is secured by a hand set screw 22 extending radially through the collar and is turned against the extending cylindrical mast 13.

Figure 6:
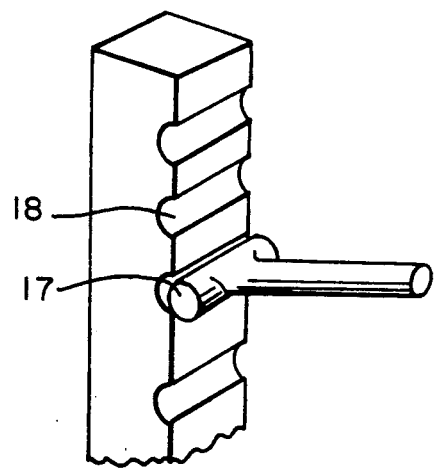
FIG. 6 is a magnified view of the cylinder-and-groove fitting between the grooved backplate and the cylindrical rear tailstock of the quill member as illustrated in FIG. 1.

The cylindrical tailstock 17 of the dopstick holding quill member is received by the multiple arcuable grooves 18 in the backplate 2 (FIGS. 1, 6) which curvatures are microscopically less than the diameter of the cylindrical tailstock. This tight fitting cylinder-and-groove interface allows both vertical and horizontal oscillation of the quill member 1 but prohibits undesirable rotation about the quill's longitudinal axis which would tend to produce rounding in the stone's facet edges, the major difficulty in traditional jamb peg machines.

To establish accurate angle settings for any angle 0°–90°, the horizontal grooves 18 are located vertically on the backplate 2 (FIG. 2) according to their strict trigonometric relationship as the opposite side to the SINE of the angle and the constant length quill which functions trigonometrically as the hypotenuse.

$$\text{SINE} > = \frac{O}{H}$$

Opposite side = vertical location of each angle groove

Hypotenuse = length of the quill member plus dopstick extension
-transposing-

SINE > *H = O = height i.e., vertical position of angle grooves on backplate

By application of this mathematical solution to angle-height setting for the calibrated jamb peg faceting machine, the height of the backplate 2—and thus the relative positions in the related vertical rows of horizontally extending arcuately shaped grooves-needs no change when cutting progress requires a different height and angle selection once the proper setup for at least one angle, usually the first angle required, has been properly established. To select a new and different angle, no machine setting is required: the tailstock cylinder 17 of the quill member 1 is placed into the desired angle slot 18 and the triangulation discipline remains intact when the attached stone is addressed to the abrasive cutting disk 3. Furthermore, all other height-angle positions after establishment of the first correct accurate height-angle setting bear a strict mathematical—and closely located—relationship which is available to the cutter throughout the entire cutting of a stone. Because the cutting action of the quill member 1 is a function of the pivoting movement at the cylindrical tailstock 17 and backplate groove 18 interface the entire quill arm conduct becomes therefore non-synchronous e.g., the correct angle of facets occur only upon the completion of each new facet cut e.g., when the exact specifications of the triangle parameters are satisfied. Subsequent angle accuracy following the precise establishment of the initial angle-height are determined by template or, as is the customary practice with non-synchronous faceting machines, visually such as by the appearance of the new facet as it encroaches on existing facets and/or with reference to an existing plan view of the cut design. What obviously occurs here when the quill member's tailstock is fitted into a different angle groove 18 the quill i.e., the hypotenuse, locates another position or area on the abrasive disk whose distance from the opposite side i.e., backplate, is consistent with the desired angle rather than, as with conventional faceting machines, necessitating a vertical movement on the mast or some such similar mechanical adjustment in the machine's components.

Figure 9:
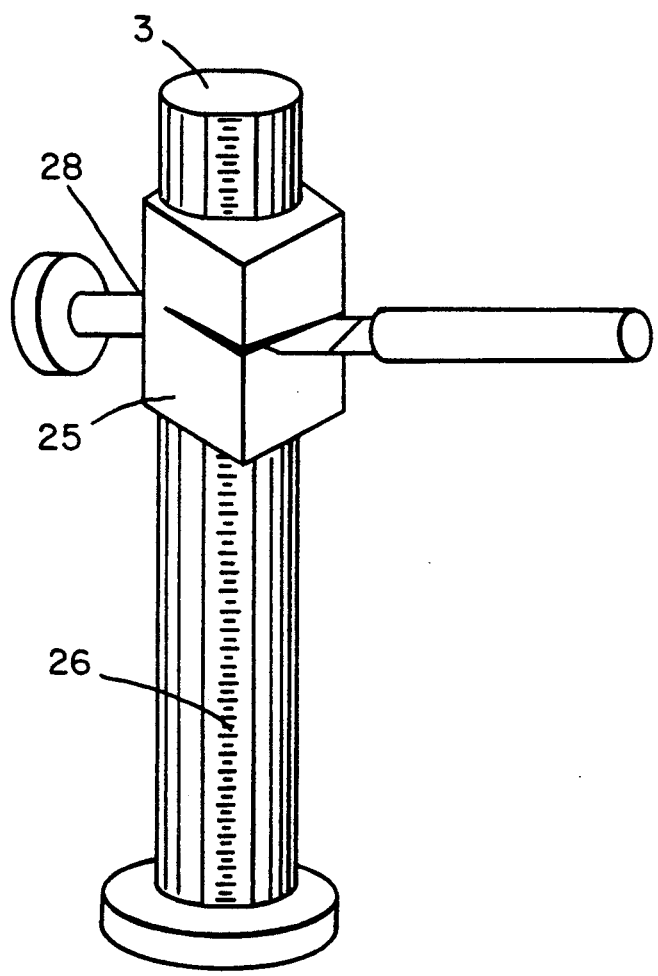
FIG. 9 is a perspective view of a possible variation for a backplate element containing a single groove and which locks by means of a hand set screw against an vertical mast indexed for angle settings.

While the present description of the backplate 2 exemplifying the trigonometric concept for angular selections emphasizes a single element with a multiplicity of grooves arranged in several vertical rows, optional backplate configurations involving a sliding backplate element with a single groove are possible such as shown in FIG. 9. FIG. 9 shows, for example, an axially sliding collar 25 with a single arced groove 28 which device could be locked at the desired angle index markings 26 on the vertical mast 3 by means of a hand set screw 27 radially tightened against the mast. Other sliding backplate collar variations could include a sliding spring-lock collar as well as a threaded mast with matching interior collar threads so the backplate could be screwed to a desired angular position. The sliding backplate variations, of course, would violate the single setting benefit of the multiple row backplate because each new vertical groove position would demand vertical movement on the mast.

It is well understood that in faceting a unique interface between all components of a faceting machine is sequentially required for each single facet whether alone or in a tier. This uniqueness arises because the faceting machine must be so configured that each facet may and must be individually grinded, individually sanded fine and then individually polished. Thus any faceting machine's setup alignment for HAI (height, angle and index) poses a constant repeatability challenge in that unique configurations must be repeated for each individual grinding, sanding, and polishing operation. This inherent repeatability obstacle can be virtually eliminated if the faceting head need not be vertically adjusted or manipulated, as with the present invention, throughout the cutting of a colored stone. Because the backplate 2 remains locked and stationary on the vertical mast 2 throughout yet still provides angle slots 18 at appropriate and predicable positions, the operator's only other machine setup obligation consists in establishing the appropriate index setting so the stone may be turned predictably upon its longitudinal axis. Index setting is achieved by aligning the appropriate index ring symmetry setting marks 19 of the lower quill portion 5 of the quill member 1 with the index guide mark 20 located on the lower tip of the upper quill portion 8. Symmetry index markings may be printed or engraved permanently onto the lower quill portion 5 or, optionally, a fitted hoop-type ring 21 with printed or engraved markings of a specific index symmetry may be fitted and removed on a standard lower quill portion 5 whose rear portion has been slightly recessed so as to receive each ring tightly and offer the same outside diameter as the upper quill portion 8. In the first variation, to change the index symmetry markings would require a completely different lower quill portion element 5 whereas the fitted rings would merely require the operator to slide onto the front element the small and inexpensive symmetry defining index ring upon which different index markings have been imprinted.

To assure the absence of drift or movement away from the index symmetry marking alignment position(s), the hand set screw 14 is tightened against the male rod 6. When a new index position is desired, the set screw is loosened, the front element turned to the appropriate address between the index ring and the index guide, and the set screw tightened again.

Having thus described my invention, I claim:

1. A calibrated jamb peg faceting machine that requires minimal mechanical manipulation to control height, angle and indexing for grinding facets upon precious stones, comprising:
   a base having an abrasive lap wheel rotatable thereon adjacent one end and a vertically extending mast rigidly supported at another end;
   a backplate slidably adjustably mounted on the mast, said backplate including a series of trigonometrically established vertically spaced and horizontally extending arcuately shaped grooves whose positions on the backplate are mathematically determined and which provide specific angle settings through triangulation;
   a quill member featuring a generally cylindrically configured male tailstock element disposed horizontally so as to fit tightly to a female profile of matching backplate grooves.

2. The faceting machine of claim 1 wherein there are multiple rows of grooves positioned vertically on the backplate and whose grooves in each row are staggered vertically with respect to the grooves of the other rows thereby obtaining a multiplicity of different angular settings.

* * * * *